(No Model.)
JOHN G. MAHON & JAMES G. MAHON.
PLANTER.
No. 595,187. Patented Dec. 7, 1897.
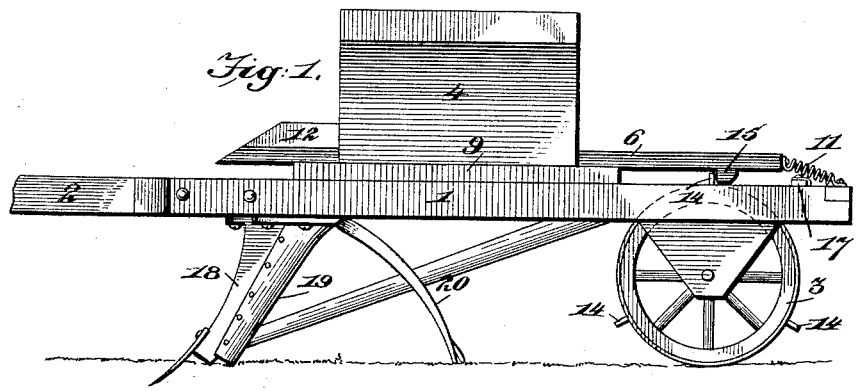
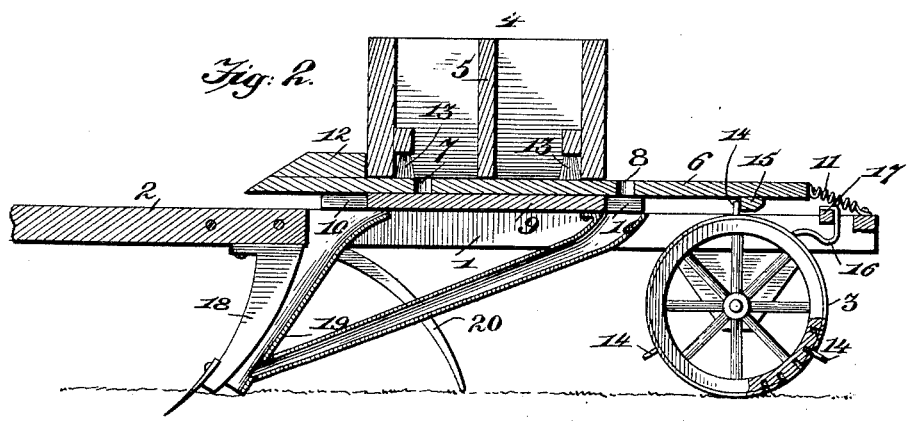
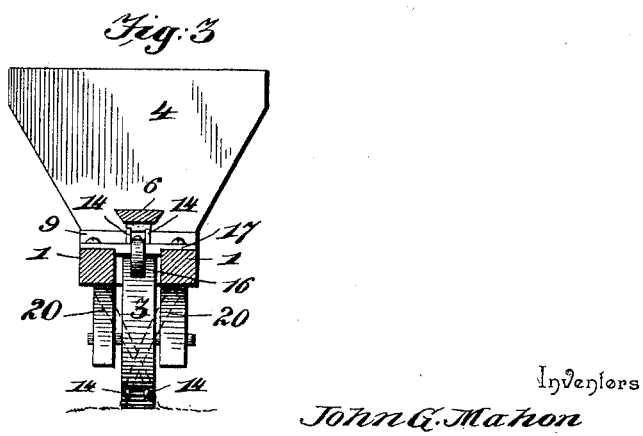
Witnesses
H. G. Dieterich
Inventors
John G. Mahon
James G. Mahon
By their Attorneys,
C. A. Snow & Co.
THE NORRIS PETERS CO., PHOTO-LITHO., WASHINGTON, D. C.

UNITED STATES PATENT OFFICE.

JOHN G. MAHON AND JAMES G. MAHON, OF BALDWYN, MISSISSIPPI.

PLANTER.

SPECIFICATION forming part of Letters Patent No. 595,187, dated December 7, 1897.

Application filed February 20, 1897. Serial No. 624,294. (No model.)

*To all whom it may concern:*

Be it known that we, JOHN G. MAHON and JAMES G. MAHON, citizens of the United States, residing at Baldwyn, in the county of Lee and State of Mississippi, have invented a new and useful Planter, of which the following is a specification.

Our invention relates to planters, and has for its object to provide a simple and efficient construction and arrangement of parts whereby seeds of different kinds may be planted either separately or simultaneously and also whereby seed and a fertilizer may be deposited in hills by one operation of the device.

Further objects and advantages of this invention will appear in the following description, and the novel features thereof will be particularly pointed out in the appended claims.

In the drawings, Figure 1 is a side view of a planter constructed in accordance with our invention. Fig. 2 is a longitudinal section of the same. Fig. 3 is a rear view, partly in section.

Similar numerals of reference indicate corresponding parts in all the figures of the drawings.

1 designates a frame comprising parallel side beams, to the front ends of which is attached a draft-beam 2, and between which, near their rear ends, is mounted an operating or ground wheel 3, having its shaft journaled in suitable blocks depending from the side beams.

Supported by the frame in advance of the operating or ground wheel is a hopper 4, preferably divided by a transverse partition 5 to form separate compartments adapted, respectively, to receive seeds of different kinds or seed and a fertilizer, and mounted for longitudinal operation in the bottom of the hopper is a common seed-slide 6, provided with seed-openings 7 and 8, adapted, respectively, to be carried by the reciprocation of the slide into the interior of the compartments of the hopper or seedbox. This slide is mounted upon a suitable bed 9, at the extremities of which are disposed openings 10, through which the seed or the seed and fertilizer are adapted to be dropped as the slide alternately reaches the limit of its movement in opposite directions, the slide being yieldingly held in its retracted position by means of a return-spring 11, and being checked at the limit of said return movement under the tension of the spring by means of a stop 12, consisting of a shoulder arranged near the front end of the slide to encounter the outer surface of the wall of the hopper or seedbox. Located within the hopper, respectively at the remote or outer walls of the compartments, are brushes 13, of which the lower extremities are disposed contiguous to the upper surface of the slide to remove surplus seed and fertilizer.

The operating or ground wheel is provided with seed-slide-actuating pins 14, arranged to project radially from the periphery thereof in pairs to encounter a beveled shoulder or projection 15 on the under side of the seed-slide near its rear end, whereby as the wheel rotates the slide is advanced at intervals to cause the front seed-opening 7 thereof to register with a contiguous notch 10 at the front end of the bed 9, and after the release of the slide by the disengagement of said actuating-pins from the shoulder or projection thereof the slide is returned to its normal position by means of the spring 11 to bring the rear seed-opening 8 into registration with the contiguous opening 10 of the bed. In order to prevent the accumulation of soil upon the periphery of the operating or ground wheel without interfering with the passage of the actuating-pins with which said wheel is provided, we employ a scraper or cleaner 16, secured to a cross-bar 17 between the side bars of the frame and bearing at its terminal upon the periphery of the operating or ground wheel between the planes of the actuating-pins. Thus while the wheel rotates said pins pass upon opposite sides of the scraper or cleaner and any soil which may be picked up by the pins is removed before the latter come in contact with the shoulder or projection on the slide.

In connection with the above-described mechanism we employ a suitable furrow-opening device 18, consisting in the construction illustrated of an opening-plow, and supported by said furrow-opening device is a seed-chute 19, of which the upper flared extremity is disposed under the front opening 10 of the seed-slide bed to receive seed as it is dropped from the slide, and in rear of the furrow-opening device are twin furrow-closers 20, consisting of spurs curved rearwardly and downwardly from the side beams of the frame and terminating in different transverse planes.

The peripheral radially-projecting actuating-pins which are carried by the operating or ground wheel are preferably made adjustable as to spaces upon said wheel to adapt the apparatus for planting seeds of different kinds in hills at different distances apart, and in practice we have found that a convenient construction consists in forming the pins of screws threaded into openings in the periphery of the wheel, and hence capable of being changed as may be desired to suit the conditions under which seed is to be planted. Furthermore, this operating or ground wheel serves as a roller, the same being provided with a transversely flat periphery, whereby after the furrow-closers have acted upon the soil the wheel traverses the furrow and compresses the loose earth thereinto.

Various changes in the form, proportion, and the minor details of construction may be resorted to without departing from the spirit or sacrificing any of the advantages of this invention.

Having described our invention, what we claim is—

1. In a planter, the combination with a supporting-frame, furrow opening and closing devices, a hopper interiorly divided into compartments, a seed-slide bed provided with terminal openings or notches, a reciprocatory seed-slide provided with seed-openings adapted to be alternately arranged in communication with the compartments of the hopper and in registration with said openings or notches of the bed, yielding means for holding the slide in its normal position, brushes for removing surplus seed from the slide, an operating or ground wheel having a peripheral series of sockets, and actuating-pins removably fitted in the desired sockets and projecting radially from the periphery of the operating or ground wheel, to successively engage a depending projection on the seed-slide to advance the same in opposition to said yielding means, whereby the required number and distribution of pins may be secured, substantially as specified.

2. In a planter, the combination with a supporting-frame, a hopper, and a reciprocatory seed-slide yieldingly held in its normal position, of an operating or ground wheel provided with spaced pairs of transversely opposite peripheral actuating-pins adapted to engage a beveled shoulder or projection upon the seed-slide to move the latter in opposition to the means whereby it is yieldingly held in its normal position, and a coöperating scraper or cleaner supported by the framework and terminally arranged to operate upon the periphery of the wheel between the planes of said transversely opposite pins, substantially as specified.

In testimony that we claim the foregoing as our own we have hereto affixed our signatures in the presence of two witnesses.

JOHN G. MAHON.
JAMES G. MAHON.

Witnesses:
MOSE WALKER,
J. E. LEWELLEN.